United States Patent

Milek

[15] 3,682,294
[45] Aug. 8, 1972

[54] TROUGHING IDLER ASSEMBLY
[72] Inventor: Robert C. Milek, Blair, Nebr. 68008
[22] Filed: April 29, 1970
[21] Appl. No.: 32,975

[52] U.S. Cl. .............................................. 198/192 A
[51] Int. Cl. .............................................. B65g 15/08
[58] Field of Search .......... 198/192, 192 A, 184, 191

[56] References Cited

UNITED STATES PATENTS

| | | | |
|---|---|---|---|
| 735,301 | 8/1903 | Robins | 198/192 |
| 2,948,384 | 8/1960 | Pate | 198/192 |
| 3,292,771 | 12/1966 | Reilly | 198/192 |
| 2,555,765 | 6/1951 | Schank | 198/192 A |

FOREIGN PATENTS OR APPLICATIONS

| | | | |
|---|---|---|---|
| 1,106,341 | 12/1955 | France | 198/191 |
| 1,227,830 | 8/1964 | Germany | 198/191 |
| 461,751 | 6/1928 | Germany | 184/ |

Primary Examiner—Richard E. Aegerter
Attorney—Henderson and Strom

[57] ABSTRACT

An assembly for supporting a conveyor belt, the assembly comprising a frame pivotally connected to a cable or the like; a rigid semicircular or concave bar secured at each end and extending downwardly from the frame; arcuately spaced tubes frictionally secured to the bar with rotatable bearings and cylindrical spacer elements concentrically disposed thereover; a rotatable helical spring disposed concentrically of the spacers and extending substantially the length of the rod; a bellows-covering surrounding the helical spring; wherein the assembly forms a rigid troughing transverse support for a conveyor belt.

9 Claims, 6 Drawing Figures

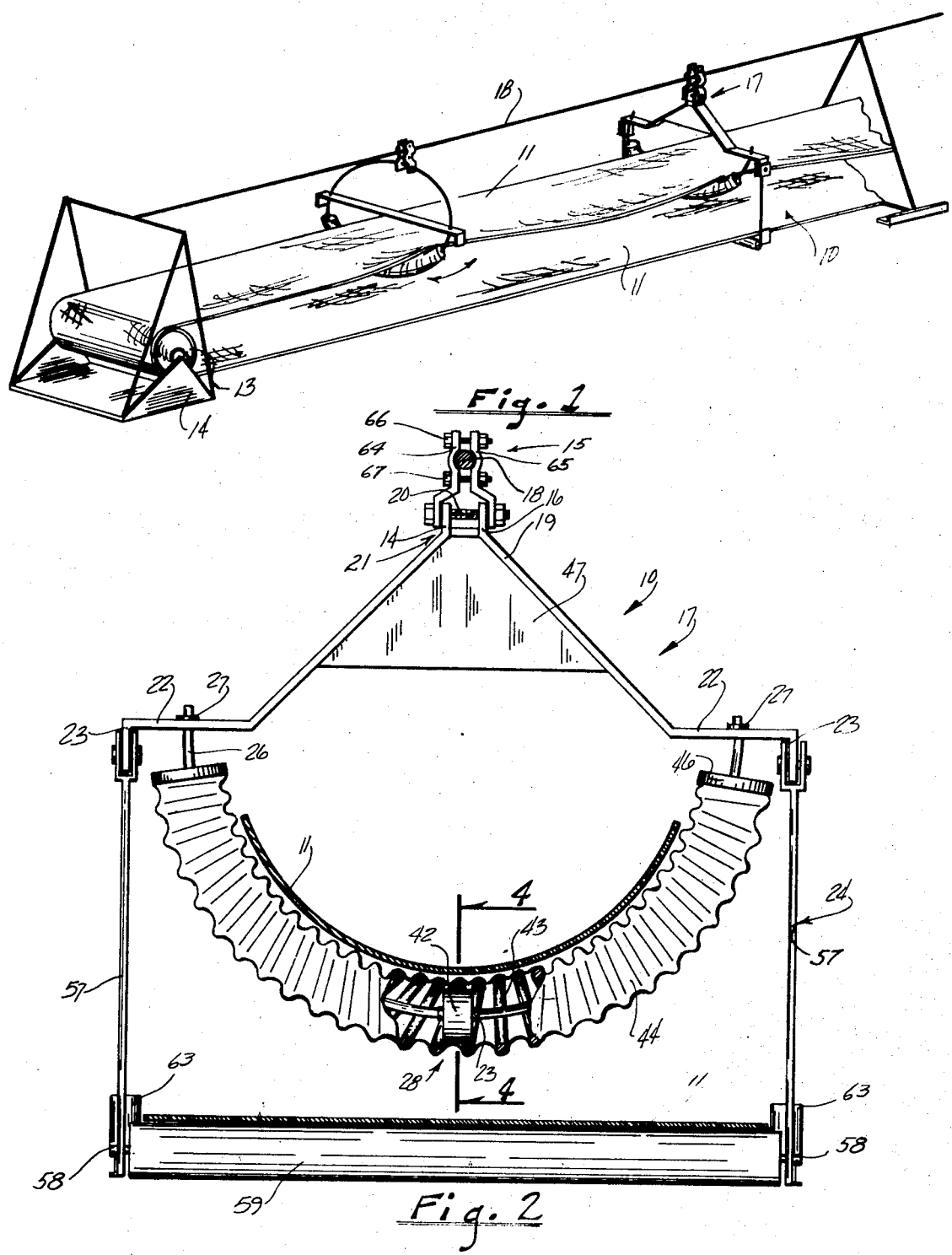

INVENTOR.
ROBERT C. MILEK
BY
Henderson & Strom
ATTORNEYS

TROUGHING IDLER ASSEMBLY

BACKGROUND OF THE INVENTION

The continuous movement of goods along a defined path is necessary in many mechanized processes of production. The most important use of the belt conveyor is to convey granular and pulverized bulk materials such as sand, cement, gravel, coal, grain and the like. Historically, a chief means for transporting bulk material has been the conveyor belt apparatus comprising a continuous belt extending along the path of desired movement, spaced-apart head and tail pulleys disposed at each end of the belt over which the belt rollerably passes, and some means of moving the belt on its stationary framework. The most common method of mechanizing the belt has been to mechanically connect a power source to the head pulley, which in turn frictionally engages the inner surface of the belt causing the belt to travel between the head and tail pulleys.

Obviously, a belt of any significant length requires some means of support intermediate the head and tail pulleys to prevent the belt's sagging longitudinally into a catenary position. Supports extending laterally across the movement path of the belt were thus introduced to help maintain a substantially horizontal disposition of the belt's path of movement. In the use of conveyor systems whereby the nature of the material carried allowed a substantially flat, lateral surface of the belt, it was only necessary to introduce a table-like surface under the belt and to possibly provide some means of reducing friction between the surface and the moving belt. However, many systems require that the belt's carrying surface assume a concave lateral configuration, thereby providing a restraint to the movement of material laterally off the belt's surface.

A common support that has been provided for this concave belt is a flexible catenary suspension means rigidly supported on each end and extending transversely under the moving belt and having some means of reducing friction therebetween. The depth of trough of a catenary with a semi-flexible core member is limited as the core member will not rotate if the depth of trough is too great. If the idler comprises only a spring, then the maintenance of proper shape is impossible, as the shape will vary according to the loading thereon. A heavy weight concentrated in the center of the belt supported by a catenary idler will cause a greater degree of concavity, whereas an evenly distributed weight will produce a lesser degree of concavity. In addition, a lopsided distribution of weight may cause the belt surface to tilt laterally to the side having the greatest weight. Extended operation of the catenary idler can cause permanent distortion, resulting in continuous readjustment of the wiper for each different load carried on the belt. The variation in the loading also causes continuous changing of the shape of the catenary and results in belt fatigue.

Substantially all of the idler assemblies manufactured to date are rigidly supported on trusses or suspended from at least two cables thus making self-alignment of each idler assembly substantially impossible with the result that considerable time and effort are required to position each idler normal to the centerline of the path of the conveyor belt.

Rigid idler supports have also been provided wherein a plurality of troughing idlers, usually three in number, have been disposed transversely to the belt path for supporting the belting in a troughing fashion. The conventional troughing idlers are available in a variety of configurations and with varying degrees of slope between the center and side rolls to provide the desired depth of trough. A three roller system will normally have one roller disposed horizontally and each of the side rollers disposed at an angle thereto thus forming a trough with each roller rotating independently of the other. With such conventional idlers, it is necessary to provide a different size of idler for each different width of belt. Free rotation must be maintained with minimal contact between the roller and the belt as the load on the belt is not always equally distributed. With each roller independent of the other and with unequal loading, there is not always the same frictional contact between the rollers and the belt.

A further problem inherent in a conventional design is the gap which is created between adjacent rollers. A loaded conveyor belt is forced between the rolls at their separation thus causing a pinching action which frequently results in a premature belt failure, furthermore the abrupt transverse change of the configuration of the belt from the horizontal to the inclined can cause failure or excessive wear to the belt. The pinching effect, failure, and/or excessive wear is more pronounced as the belt trough is increased and, with conventional three-roll idlers, the maximum practical angle of trough is 45°.

Yet another inherent disadvantage of the conventional idler assemblies, and particularly in the rigid idler supports, lies in the mounting of the rollers on the supports and the securement of the supports to the structure. With each roller rigidly bolted to the support structure, considerable care must be taken to assure perfect or substantially perfect alignment of each roller relative to the other rollers. If one roller is misaligned, erratic belt travel can occur. It is often found that, upon installation of the rigid idler assemblies, many adjustments are required for individual rollers and complete assemblies before proper belt travel is acquired. Furthermore, with rigid securement of the idler assembly to the support structure, the assembly is not self-aligning and special pivotal idler assemblies are often provided at intervals along the structure to ensure proper training of the belt to insure proper travel.

The idler assemblies of a rigid system take a continuous impact loading as lumps or the like are carried by the belt. The lumps cause a slight, temporary disfiguration of the belt and when that portion of the belt hits or passes over an idler assembly, impact occurs. Impact can cause misalignment of individual rollers, unnecessary shock on individual rollers or the entire assembly and support structure and unnecessary wear.

Conventional three-roll idlers are not self-cleaning and foreign matter will build up on the surface of the roller and cause displacement of the belt. The foreign matter also builds up on the idler framework and supporting structure thereunder which prevents proper rotation of one or more of the idler rolls with the belt sliding instead of rolling thereover. It has been found that lumps of material or build-up on the rollers of less than one inch can cause serious damage to the belt carcass. In addition, rollers which are out-of-square with the centerline of the conveyor can cause the belt to run off the rollers, the head pulley, the tail pulley, and/or to run to one side on one or more of the idlers.

SUMMARY OF THE INVENTION

This invention relates generally to an idler assembly and more specifically to a troughing idler assembly for supporting a conveyor belt. A rigid concave bar extends downwardly between its two ends which are secured to a frame. Arcuately spaced and secured to the bar are a plurality of tubes over which bearings are rollerably secured. Concentrically secured to the bearings are cylindrical spacer elements having outside diameters slightly smaller than the inside diameter of an elongated helical spring, which spring fits over the elements and extends substantially the length of the bar and is rotatable thereon. An elongated hollow bellows may be mounted over the spring and is sealed at its ends to prevent the entry of dirt and foreign matter into the system.

The frame is pivotally secured to a holding bracket which in turn is adapted to be secured to a cable or supporting truss. The frame will pivot about a vertical axis and a horizontal axis wherein, if a misalignment of the belt occurs, the assembly will slightly pivot about its vertical axis and cause the belt to realign or, if impact loading such as the belt having a lump thereon, hits an assembly the assembly will pivot about its horizontal axis, thus substantially absorbing the impact loading instead of transferring same to the structure.

It is an object of this invention to provide an idler assembly having a rigid curved design for providing a deep trough with uniform continuous curved support for the conveyor belt. The uniform curve permits troughing the belt into a U-shaped or modified U-shaped configuration with no abrupt pinch points in the support bed. A further object of this invention is to provide an idler assembly which is light in weight, thus reducing the load on the supporting structure.

Another object of this idler assembly is the provision of a single rotatable support under the belt, thus providing increased frictional contact between the belt and idler for increasing the turning effect with a smaller roll diameter.

A further object is the provision of an idler assembly which permits the use of a variety of conveyor belt widths on a single width idler.

Yet another object of this invention is to provide an idler assembly which is adapted for use in any type of supporting structure, for example, mounted in a conventional support stand on a top-running rigid truss or suspended from a yoke frame secured to a rigid support truss; but even more important, it may be suspended from a single cable which in turn is supported at intervals by a simple frame.

Yet a further object of this invention is the provision of an idler assembly which uses a helical spring, mounted on a plurality of rollers wherein the spring supports the belt and as it rotates in a continuous rigid concave path, the coils of the spring will close on top to prevent foreign matter from falling therethrough and open on the bottom to permit any dust or foreign matter therein to escape. Thus the continuous rotation and flexing of the spring will prevent the build-up of foreign matter therein.

Still another object of this invention is to provide an idler assembly for a belt conveyor which is suspendable from a structure or cable in a non-rigid state to provide a small pivotal action therein for automatic self-alignment of the assembly to conform to the belt travel.

Another object of this invention is the provision of a troughing idler assembly utilizing a rigid concave support for a conveyor belt which maintains its shape regardless of the load on the belt.

A further object of this invention is the provision of a troughing idler assembly having a substantially uniform, concave lateral support surface which offers little resistance to a moving conveyor belt.

Yet another object of this invention is to provide a troughing idler assembly for rollerably supporting a belt, which is sealed thus preventing foreign objects and the like from contacting or contaminating the parts therein.

Still a further object of this invention is the provision of an idler assembly which permits the attachment of a conventional return belt idler thereto, thus eliminating the necessity for a separate support structure for the return belt run.

A still further object of this invention is to provide an idler assembly for a conveyor belt which is universally adapted to support belts of different widths and is suspendable from a non-rigid structure; thus resulting in a greater flexibility of design; economy of fabrication, warehousing and distribution; simple in installation; and extremely practical and rugged in use.

These objects and other features and advantages become more readily apparent upon reference to the following description when taken in conjunction with the appended drawings.

In the drawings as hereinafter described, a preferred embodiment of the invention and a modified embodiment are included; however, various modifications can be made thereto without departing from the true spirit and scope of the invention.

BRIEF DESCRIPTION OF THE DRAWINGS

FIG. 1 is a perspective view of the preferred embodiments of this invention as they are used in combination with a belt conveyor system.

FIG. 2 is a front elevational view of the preferred embodiment, parts being broken away and in section to reveal details of construction.

Figure 3:
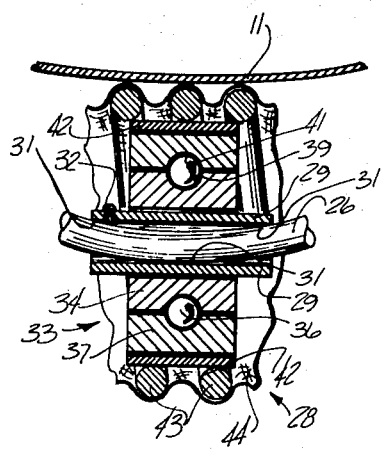
FIG. 3 is a partial, enlarged sectional view, particularly showing one of the roller units of this invention.

Referring now to the drawings and particularly to FIG. 1, the troughing idler assembly of this invention is indicated generally by the numeral 10. The assembly 10 is shown in assembled relation with a conventional, flexible, endless conveyor belt 11 entrained over and about spaced-apart head (not shown) and tail pulleys 13, each rollerably supported on shafts. The assembly 10 (FIG. 2) comprises a frame 17 secured to a cable 18; however it is contemplated that the frame 17 could be supported from a beam or mounted on a base, neither of which is shown in the drawings. The frame 17 comprises an A-shaped element 19 which is detachably secured at its apex 21 to the cable 18. The apex 21 includes a pair of spaced-apart bars 14 and 16 which project upwardly from the frame 19. Each bar has an enlarged opening (not shown) formed therethrough near the upper end thereof which is in horizontal alignment with the opening of the other bar. The bars 14 and 16 are adapted to pivotally receive a holding bracket 15 (hereinafter described), secured by a bolt 20 and rigidly clamped to the cable 18. The frame 19 will pivot slightly about a vertical axis relative to the holding bracket to allow the frame to self-align in a position normal, or substantially normal to the centerline of the conveyor belt. The purpose of the pivotal action between the frame and holding bracket has been discussed hereinabove. Integral with and projecting outwardly and substantially horizontally from each of the lower ends of the element 19 is an arm 22, the outer end 23 of which is bent to depend therefrom. Attached to the arm outer end 23 is a substantially U-shaped member 24 for supporting the belt 11 on its return. Furthermore, the member 24 may be secured to a support (not shown) in the event the assembly 11 is not supported by a cable 18.

Secured to and depending from the arms 22 (FIG. 2) at points inward from the outer end 23, is a semi-circular rigid bow 26. The ends of the bow 26 are threaded and protrude vertically upwardly through holes (not shown) drilled in the arms 22 and are secured thereto by nuts 27. However the bow ends could be secured by pins or the like. Mounted over the bow 26 are a plurality of spaced apart roller units 28.

Each roller unit 28 (FIG. 3) comprises a straight tube 29, of greater diameter than the diameter of the bow 26 and of sufficient length to frictionally engage the bow at three points 31. To prevent accidental movement of the tube 29 on the bow 26, the tube may be provided with an opening therethrough to threadably receive a set screw 32 or the like, for securing the tube to the bow.

Secured to the periphery of the tube is a conventional ball bearing unit 33 having an inner race member 34, a plurality of balls 36, and an outer race member 37. The inner race member 34, annular in shape and having a concave annual track 39 formed in the periphery thereof, is slidably mounted over the tube and frictionally secured thereto. The outer race member 37, also annular in shape and having a concave annular track 41 formed on the inner surface thereof, is rollerably disposed over the inner track member with the tracks 39 and 41 aligned to form a raceway for the balls 36. Frictionally mounted on the periphery of the outer race member 37 (FIG. 3) is a spacer 42 of annular construction, wherein by changing the width of the spacer, the diameter of the rolling unit may be changed.

The spacers 42 (FIG. 3) are adapted to rollerably support the belt 11, however to eliminate excessive wearing along the path of contact therebetween and to distribute the weight of the load uniformly across each of the roller units, an elongated helical spring 43 (FIG. 2) having an inside diameter substantially equal to or slightly less than the outside diameter of the spacer 42, is concentrically and frictionally disposed thereover.

The ends of the spring 43 extend at least to the outer ends of each of the outer roller units 28. To protect the roller units 28 from exposure to dust and foreign matter, an elongated hollow member 44 is disposed under the belt 11 and over the spring with the ends thereof extending beyond the ends of the spring 43. The bellows member 44 is constructed of a flexible material such as rubber or the like. Secured to each end of the bellows member 44 are disk-like sealing elements 46, with each element 46 having an opening formed axially therethrough, through which the bow 26 extends.

In an installation, depending on the weight of material to be conveyed and the length of the belt, a plurality of spaced-apart assemblies 10 are disposed along the belt with the bow 26 disposed transversely to the path of the belt 11. As the belt 11 moves through each assembly 10 and in contact with the bellows member 44, the bellows member 44, spring 43, spacer 42, and outer race member 37 rotate about the inner race member 34 on the balls 36. The weight of the belt 11 and the material carried thereon will tend to cause the bow 26 to elongate vertically, thus causing the legs of the element 19 to converge, therefore a brace 47 (FIG. 2) may be mounted between the element legs to prevent distortion of the bow.

In operation, as the belt travels on the idler assemblies, an uneven load on the belt or foreign objects between the assembly and the belt may tend to misalign the belt; however, the slight pivotal action of the frame, made available by its connection to the holding bracket 15 and element 19, permits the assembly to self-align normally to the centerline of the conveyor belt.

Figure 4:
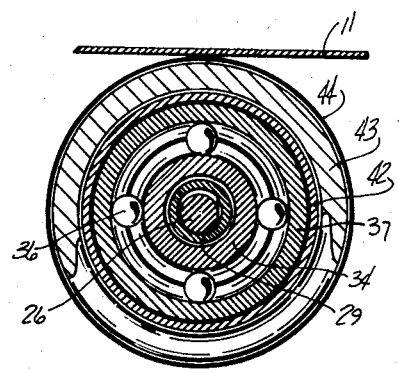
FIG. 4 is a sectional view as taken along the lines 4—4 in FIG. 2.
Figure 5:
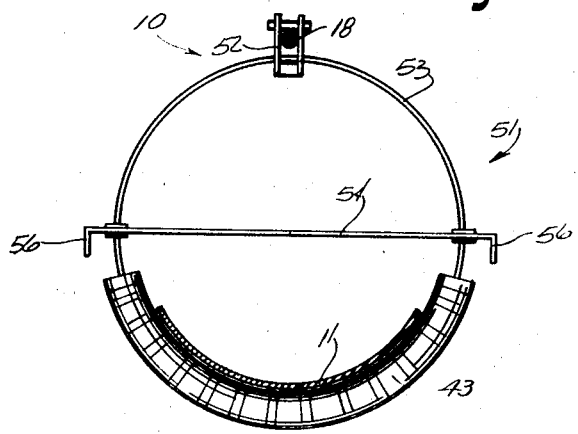
FIG. 5 is a perspective view of the modified embodiment as it is used in combination with a conveyor belt.

A modified embodiment of the frame and bow of the invention is disclosed in FIG. 5. The frame 51 comprises only a hanger 52 adapted to be secured to the cable 18 or the holding bracket 15 (FIG. 2) Secured to the hanger 52 is a circular hoop or bow 53 having a plurality of roller units 28 (FIGS. 3 and 4) mounted on the lower half of the hoop, which are identical to the units 28 hereinabove described. A brace member 54 is disposed horizontally between and secured on opposite ends to the hoop 53, thus preventing distortion of the hoop when weight is applied to the belt 11. If a return idler is required, a pair of outstanding links 56 are secured, one on each end, to the ends of the brace 54. Depending from and secured to the free end of each link 56 is a vertically disposed post 57 (FIG. 2). Interconnecting the free ends of the post 57 is a crossmember 58 or the like having a return roller 59 mounted thereon over which the belt 11 returns. In the event the belt is to carry a load which may contact the brace 54, the brace may be formed in an A-shape intermediate the ends thereof to permit greater clearance above the belt.

Figure 6:
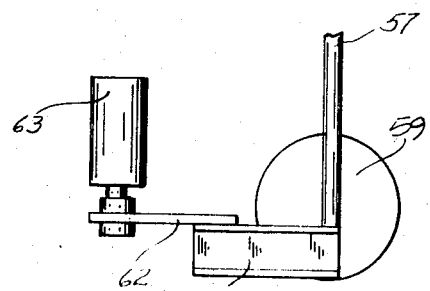
FIG. 6 is a side elevational view of the side or training idlers of this invention.

Secured to the posts 57 lower ends (FIGS. 2 and 6) and projecting substantially parallel to the line of travel of the belt is an arm 61. Pivotally connected to the free end of the arm is one end of a link 62 having a vertically disposed roller 63 rotatably secured to the other end thereof. The link 62 is adapted to be locked in any predetermined position relative to the arm. If the belt tends to run to either side on the return roller 59, it will contact the side idler which in turn causes the frame 19 to pivot slightly, thus realigning the frame normal to the centerline of the conveyor belt.

The holding bracket 15 (FIG. 2) comprises a pair of spaced-apart legs 64 and 65, each leg having an offset formed therein opposed to the offset in the other leg. The lower end of each leg has a first bend formed therein wherein the leg angles away from its counterpart. A second bend is formed below the first bend of each leg so that the bottom ends are parallelly disposed to each other. A plurality of paired and aligned openings are formed in the legs, one above the offset, the second below the offset, and the third in the bottom end thereof. The first two pairs of openings receive bolts 66 and 67, while the third pair receives the bolt 20. The upper pair of bolts are provided to clamp the cable 18 between the legs. The openings formed in the bars 14 and 16 are enlarged or greater than the diameter of the bolt 20, thus when the legs are clamped about the cable and bolted to the bars, a slight pivotal action will be available therebetween to allow the assembly to self-align. It will be noted that this pivotal action will be about a vertical axis to alleviate any misalignment problem and about a horizontal axis to absorb an impact loading.

The spring 43 also acts to absorb impact loading wherein non-uniformity in the material may cause an unequal distribution of the load across the belt. The unequal distribution can and does cause a slight distortion in the shape of the belt. If this distortion occurs between rollers, the spring will conform thereto, and if the distortion occurs at a roller, the horizontal pivotal action will allow the assembly to swing thus the impact will be substantially absorbed.

The closed bow and frame further serves as a wind hoop thus preventing lifting of the belt from the idler assembly due to wind or the like.

I claim:

1. A troughing idler assembly adapted to be connected to a conveyor structure for supporting a conveyor belt, the assembly including:
   frame means pivotally suspended from the structure, wherein said frame means pivots about the horizontal axis disposed at a right angle to the line of travel of the belt;
   a concave rigid bow suspended from said frame means;
   a plurality of spaced roller means attached to said bow; each roller means comprising a straight tube mounted over said bow of greater diameter than the diameter of said bow and of proper length to frictionally engage the bow at three points, bearing means secured to said tube, and an annular spacer secured to the periphery of said bearing:
   and an elongated spring coil concentrically mounted on said spacers for rollerably supporting said belt.

2. A troughing idler assembly as defined in claim 1 wherein said frame means comprises a holding bracket adapted to be secured to the structure and a frame pivotally connected to said holding bracket, wherein said frame is adapted to pivot about both a vertical axis and a horizontal axis.

3. A troughing idler assembly as defined in claim 2 wherein said bow is semicircular in form and each end thereof is secured to said frame; and including further a substantially horizontally disposed brace secured at its ends to the ends of said bow to prevent distortion thereof.

4. A troughing idler assembly as defined in claim 3 wherein said frame is semicircular in form and integral with said bow to form an annular ring.

5. A troughing idler assembly as defined in claim 4 and including a pair of spaced apart posts, each said post having one end connected to said frame and having the other end depending therefrom and extending below said bow; and a horizontally disposed return roller rotatably supported between the other ends of said posts.

6. A troughing idler assembly as defined in claim 5 and including a pair of spaced-apart side idler means each secured to the other end of said posts; each said side idler means comprising an arm secured to said post, a link adjustably secured to said arm, and a vertically disposed roller rotatably mounted on said link, said side idler means adapted to pivot said frame in said holding bracket when contacted by the belt.

7. A troughing idler assembly as defined in claim 1 wherein said bearing means includes an elongated hollow bellows member mounted over said coil with the belt riding on the periphery thereof, said bellows member acting as a seal to prevent foreign matter from contacting said bow, tube, bearing, spacer and coil disposed thereunder.

8. A troughing idler assembly as defined in claim 7 and including seal means mounted on the ends of said bellows member and beyond the outermost roller means, thus sealing the inside of said bellows member, said seal comprising a disk-like element having an opening formed axially therethrough, through which the bow extends.

9. A troughing idler assembly adapted to be connected to a conveyor structure for supporting a conveyor belt, the assembly including:
   a holding bracket secured to the structure;
   a frame pivotally suspended from said holding bracket wherein said frame will pivot about a vertical axis and a horizontal axis disposed at a right angle to the line of travel of the belt;
   a concave, rigid bow suspended from said frame;
   roller means mounted on said bow; and
   an elongated coil spring concentrically mounted on said roller means for rollerably supporting the belt.

* * * * *